US005551535A

United States Patent [19]

Krolo et al.

[11] Patent Number: 5,551,535

[45] Date of Patent: Sep. 3, 1996

[54] DEVICE FOR ENSURING SAFETY BY PREVENTING MECHANICALLY RAISED AND LOWERED COMPONENTS FROM CRASHING DOWN

[75] Inventors: Mirko Krolo, Nagold; Robert Röcker, Mössingen, both of Germany

[73] Assignee: Flender-Himmelwerk GmbH, Tübingen, Germany

[21] Appl. No.: 397,903

[22] Filed: Mar. 3, 1995

[30] Foreign Application Priority Data

Mar. 5, 1994 [DE] Germany .......................... 44 07 416.6

[51] Int. Cl.[6] ...................................................... F16D 55/14

[52] U.S. Cl. ........................ 188/72.2; 188/72.7; 188/346; 277/68

[58] Field of Search ................................. 188/72.2, 72.3, 188/72.7, 73.45, 166, 171, 167, 170, 173, 346; 160/310, 311, 296, 298; 277/17, 18, 68, 71, 133

[56] References Cited

U.S. PATENT DOCUMENTS

| | | | |
|---|---|---|---|
| 4,280,073 | 7/1981 | Miller | 188/72.2 X |
| 4,333,550 | 6/1982 | Shirai | 188/72.2 |
| 4,445,596 | 5/1984 | Waters et al. | 188/171 |
| 4,852,890 | 8/1989 | Borowski | 277/71 X |
| 4,913,450 | 4/1990 | Asberg | 277/68 |
| 5,035,436 | 7/1991 | Rockwood et al. | 277/71 X |
| 5,186,286 | 2/1993 | Lindberg | 188/72.3 X |

*Primary Examiner*—Lee Young
*Attorney, Agent, or Firm*—Max Fogiel

[57] ABSTRACT

A device for ensuring safety by preventing mechanically raised and lowered components, roll-up gates for example, from crashing down when the motor or transmission fails. The device is characterized by a friction clutch. The friction clutch comprises a stationary half and a moving half. The stationary half is secured to the shaft inside a housing. The moving half is mounted on a base and can be electromagnetically displaced axially in relation to the base and against the stationary half. The force exerted by the moving half against the stationary half is augmented by resilient components that engage between the housing and the moving-half base.

10 Claims, 4 Drawing Sheets

DEVICE FOR ENSURING SAFETY BY PREVENTING MECHANICALLY RAISED AND LOWERED COMPONENTS FROM CRASHING DOWN

BACKGROUND OF THE INVENTION

The present invention concerns a device for ensuring safety by preventing mechanically raised and lowered components from crashing down when a motor or transmission fails. An example is a gate that rolls up and down subject to a shaft.

Mechanically raised and lowered components have as a rule been prevented from crashing down in the event of failure by automatic brakes or springs. In many applications, however, roll-up gates for example, these measures are considered unsatisfactory. Safety-ensuring devices in the form of electromagnetically activated interlocking clutches are accordingly known. They are independent and not part of the transmission. They have a drawback in that, especially when the components being raised and lowered are heavy, such clutches must accommodate powerful sudden forces, which subject its components to particularly severe materials stress.

SUMMARY OF THE INVENTION

The object of the present invention is a device for ensuring safety by reliably preventing mechanically raised and lowered components, roll-up gates in particular, from crashing down when the motor or transmission fails but without the aforesaid drawbacks.

This object is attained in accordance with the present invention in a device of the aforesaid genus with a friction clutch. The friction clutch comprises a stationary half and a moving half. The stationary half is secured to the shaft inside a housing. The moving half is mounted on a base and can be electromagnetically displaced axially in relation to the base and against the stationary half. The force exerted by the moving half against the stationary half is augmented by resilient components that engage between the housing and the moving-half base.

Instead of the conventional interlock clutch accordingly, the present invention employs a friction clutch to exert a braking moment on the shaft that raises and lowers the raised and lowered component. Friction clutches accommodate forces more gradually than interlocking clutches do when they engage, and accordingly do not wear away as rapidly. To ensure an adequate braking moment, the moving half is displaced in relation to the support not only electromagnetically but also by resilient components exerting a force between the housing that accommodates the stationary half and the base of the moving half.

Both the moving half and the stationary half can have a lining over the surface that contacts the other half to improve friction and protect the material the half is made of.

The moving half in one preferred embodiment of the present invention comprises two parallel disks. The disks can rotate against each other to a limited extent. Their facing surfaces have ramp-like elevations. The elevations slide against each other as the moving half comes to rest against the stationary half, and force the two halves apart axially. This feature augments the force exerted between the stationary-half housing and moving-half base by the resilient components and accordingly the braking force exerted by the clutch as whole. Thus, as soon as the crash-prevention feature comes into action and the moving half comes to rest against the stationary half, the two disks will begin to rotate and further brake the shaft.

The moving half of the clutch can be displaced axially in relation to the moving-half base against the stationary half by at least one electromagnet and in the opposite direction by at least one spring. Electricity can be supplied to the magnet or magnets by a switch controlled by a pulse comparator. The switch has two inputs and one output. The first input accepts a sequence of pulses representing the speed of the shaft. The second input accepts a sequence of pulses representing the speed of the motor. The output emits a signal that discontinues the supply of electricity. Such a switch is simple and inexpensive and requires little modification of existing mechanisms. There are accordingly no problems in installing it in an existing safety-ensuring device.

The circumference of the stationary half can in this event be wrapped around by an annular pulse generator. The generator can generate the sequence of pulses that represent the speed of the shaft.

Further advantages can be achieved if the stationary half of the clutch travels back and forth inside the housing that accommodates the shaft and can be forced against the housing by the moving half of the coupling when the device comes into action.

The surface of the stationary half that faces the housing can for this purpose also have a lining. Very powerful braking-moment generating forces can accordingly be accommodated when the stationary half comes to rest against the stable housing. This embodiment is accordingly particularly appropriate for preventing such heavy components as roll-up gates from crashing down.

Such an embodiment can have both a seal and a baffle between the housing and the stationary half. The baffle will divert any transmission oil that penetrates the seal out through outlets in the housing. The stationary half is accordingly doubly isolated, first by the seal and second by the baffle and outlets, from oil that might undesirably the two halves of the clutch.

BRIEF DESCRIPTION OF THE DRAWINGS

A preferred embodiment of the present invention will now be specified with reference to the drawing, wherein.

DESCRIPTION OF THE PREFERRED EMBODIMENTS

Figure 1:
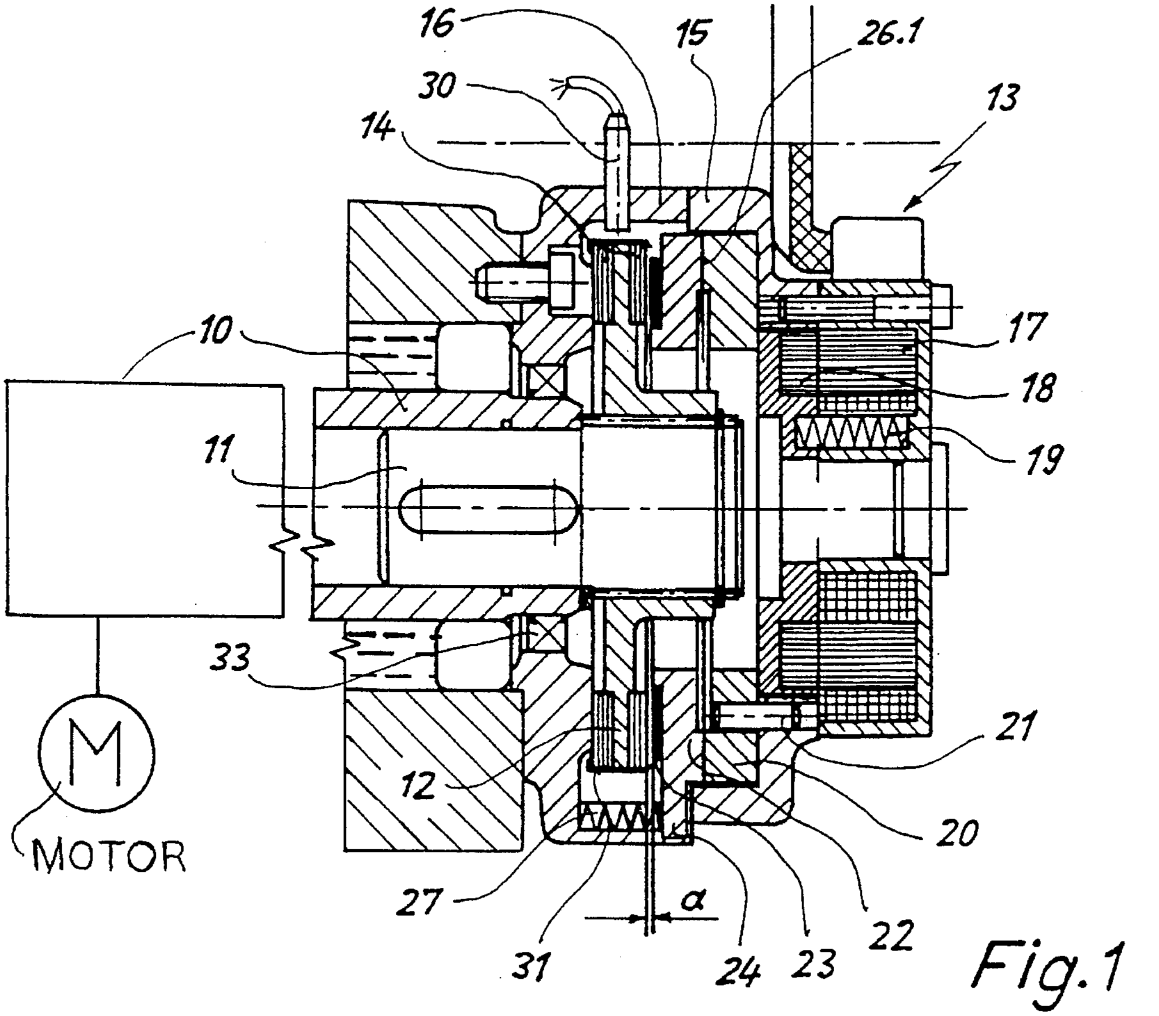
FIG. 1 is a section along the midplane of a device for ensuring safety.
Figure 2:
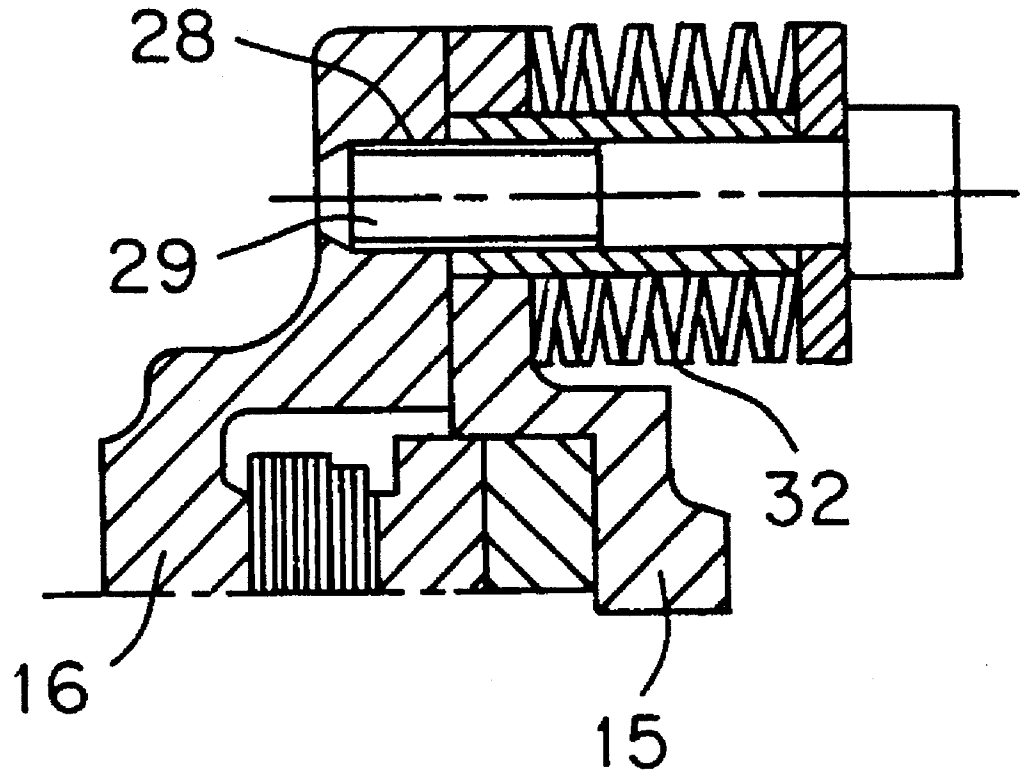
FIG. 2 is a partly sectional detail of the device illustrated in FIG. 1.
Figure 4:
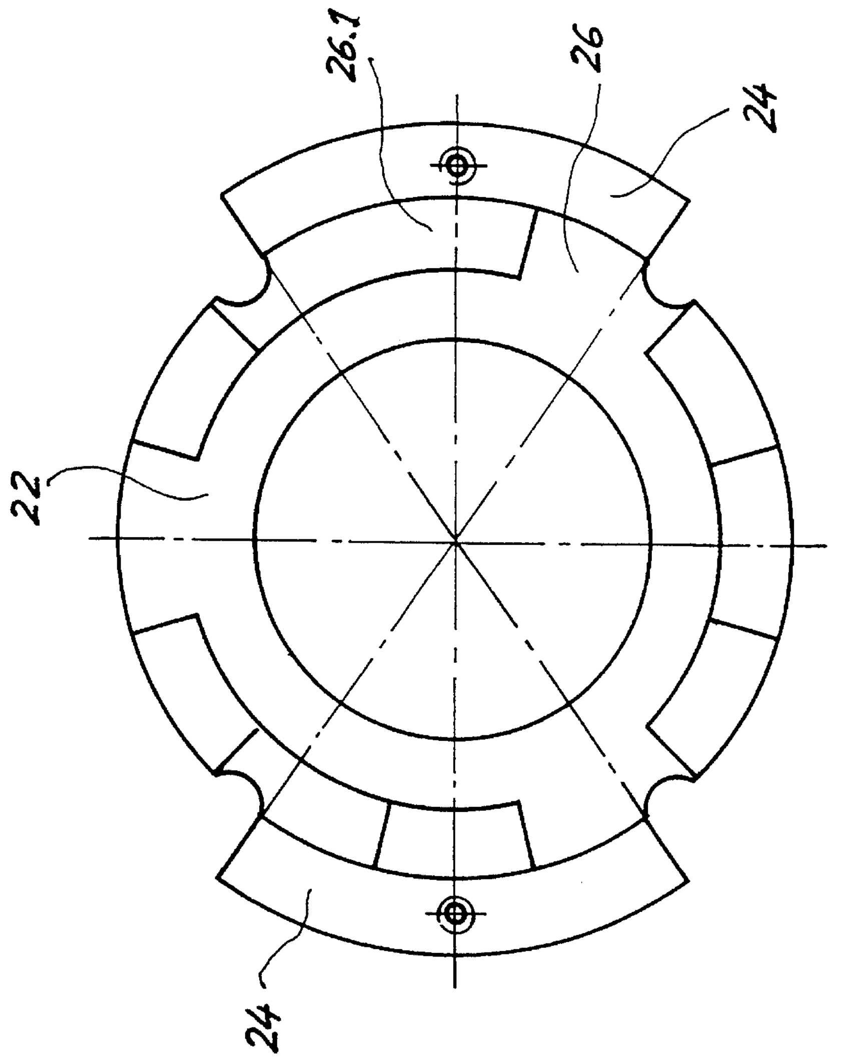
FIG. 4 is a top view of a type of disk employed in such a device.
Figure 5:
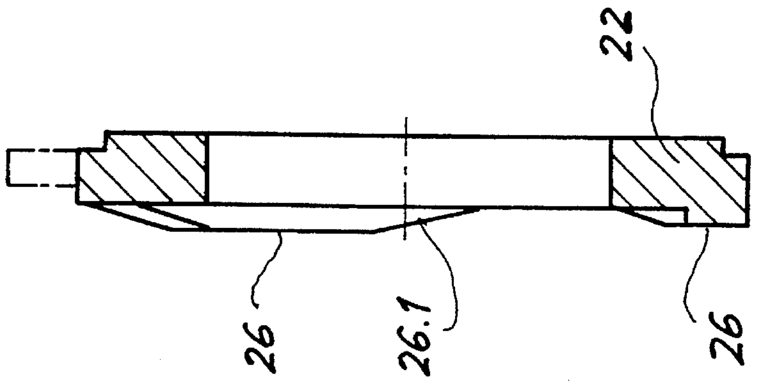
FIG. 5 is a longitudinal section through the disk illustrated in FIG. 4.
Figure 6:
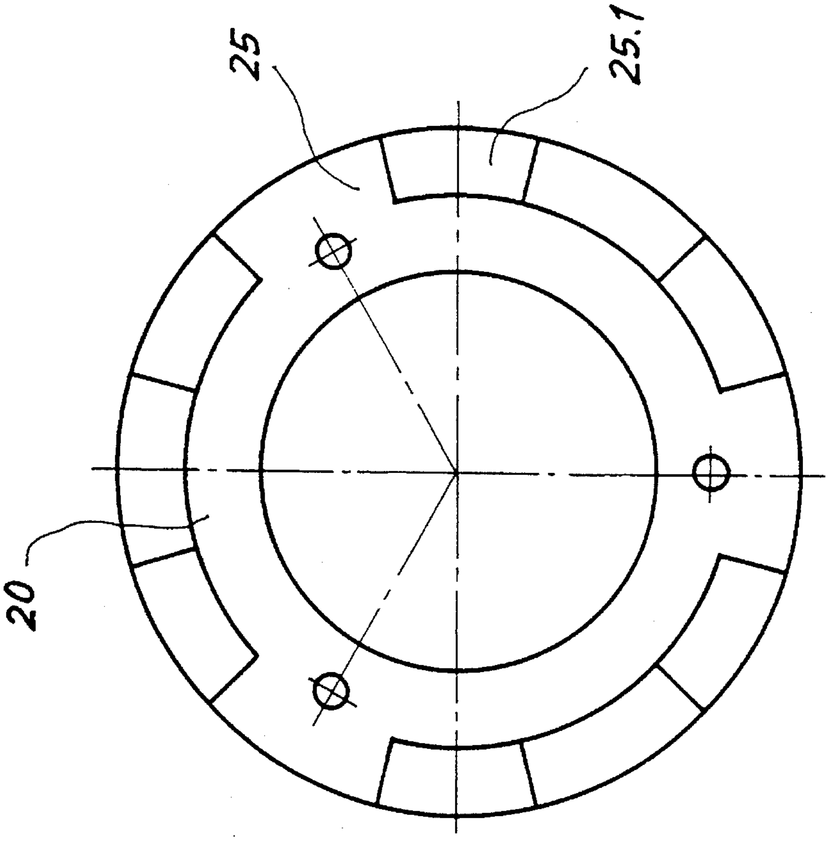
FIG. 6 is a top view of another type of disk employed in such a device.
Figure 7:
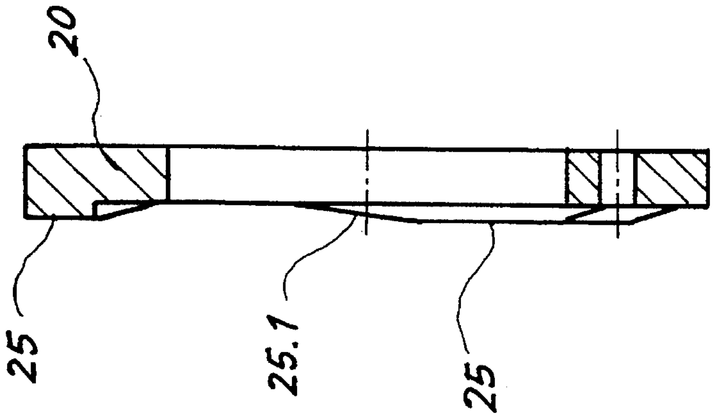
FIG. 7 is a longitudinal section through the disk illustrated in FIG. 6.

A journal 11 is inserted into the end of a shaft 10 that raises and lowers an unillustrated roll-up gate. The stationary half 12 of a friction clutch slides back and forth along but does not rotate on stationary half 12. The other half 13 of the clutch moves. There is a lining 14 on the surface of stationary half 12 that faces moving half 13 and another lining 14 on the surface that faces a housing 16. Moving half 13 includes a base 15. A magnetic coil 17 is fastened to base 15. Electricity flows through magnetic coil 17 in normal operation, and the coil secures a disk-shaped armature 18 in place against the force exerted by springs 19 that engage between the armature and moving-half base 15. The base 15 of moving half 13 is also connected by pins 21 to a first disk 20. Base 15 and disk 20 can move toward and away from each other but cannot rotate in relation to each other. Disk 20 operates in conjunction with another disk 22. The front of second disk 22 is covered with a lining 23. Lining 23 comes to rest against the lining 14 on stationary half 12 when the device comes into action. FIGS. 4 through 7 illustrate disks 20 and 22. As will be evident from FIG. 4, second disk 22 has stops 24 around it that limit its rotation against first disk 20. As will be especially evident from FIGS. 5 and 7, disks 20 and 22 also have ramp-like elevations 25 and 26. Elevations 25 and 26 interlock during normal operation and are secured in that position by compression springs 27 as illustrated in FIG. 1. There is in this situation a gap between stationary half 12 and second disk 22 that allows stationary half 12, journal 11, and gate raising-and-lowering shaft 10 to rotate freely. The base 15 of moving half 13 is, as will be evident from FIG. 2, connected to housing 16 by bushings 28 and screws 29 such that it can move toward and away from but not rotate against the housing and, in the state in question, is resting against it.

The operating state of the gate is monitored by a pulse generator at the motor and another at the transmission. The sequences of pulses generated by these devices are constantly monitored by a pulse comparator. If the difference deviates from a reference, the supply of electricity to magnetic coil 17 is interrupted and the safety-ensuring device accordingly actuated. Some components of the controls are illustrated in FIG. 1, specifically a proximity switch 30 and an annular pulse generator 31 that extends along the circumference of stationary half 12 and generates pulses representing the speed of gate raising-and-lowering shaft 10.

How the safety-ensuring device operates will now be specified.

When one of the components of the mechanism that raises and lowers the gate breaks or otherwise fails, the controls sense a deviation in the difference between the pulses representing the speed of the motor and those representing that of the transmission and discontinue the supply of electricity to magnetic coil 17. Armature 18 is released and forced by springs 19 and disks 20 and 22 against the stationary half 12 of the clutch. The gap closes, and stationary half 12 exerts friction against both housing 16 and second disk 22. Since the friction between the lining 14 on stationary half 12 and the lining 23 on second disk 22 is more powerful than the friction between disks 20 and 22, second disk 22 will rotate against first disk 20. The rotation forces the sloping surface 25.1 of elevation 25 to slide over the sloping surface 26.2 of elevation 26 until the stops 24 on second disk 22 come to rest against housing 16 and prevent farther rotation. The sliding of elevations 25 and 26 against each other progressively separates disks 20 and 22 until the stops 24 on second disk 22 come to rest against housing 16. The axial motion forces first disk 20 against the base 15 of moving half 13, producing a gap between base 15 and housing 16 and compressing resilient components in the form of a stack 32 of springs accommodated therein. The additional braking moment decelerates and stops the shaft 10 that raises and lowers the gate.

Figure 3:
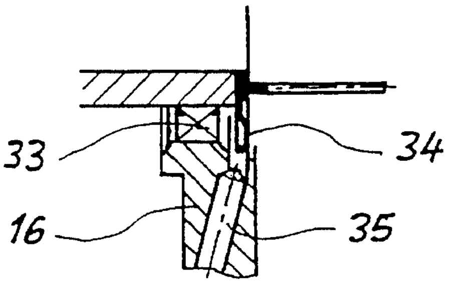
FIG. 3 is another partly sectional detail of the device.

The present invention also features means of preventing leaking oil from reaching the mating surfaces stationary of the clutch and impairing its function by lubricating them. FIG. 3 is a detail of an annular seal 33 between the transmission for gate raising-and-lowering shaft 10 and stationary half 12. Seal 33 prevents lubricating oil from leaking out of the transmission and into the housing that accommodates stationary half 12. If seal 33 fails, baffles 34 divert any leaking oil out of housing 16 through outlets 35.

We claim:

1. A safety device for preventing mechanically raised and lowered means and roll-up gates from crashing downward when a motor or transmission fails, comprising: a friction brake having a stationary half and a moving half; housing; said stationary half being secured to a shaft inside said housing; the motor having motor means for driving said mechanically raised and lowered means and roll-up gates through said shaft; said moving half being mounted on a base and being electromagnetically displaceable axially in relation to said base and against said stationary half, a force exerted by said moving half against said stationary half being augmented by a first spring engaging between said housing and said base; supplying said electricity, said moving half comprising two parallel disks rotatable against each other and engageable with said stationary half and held by said base; at least one electromagnet and at least one second spring; a switch for supplying electricity to said electromagnet; said electromagnet having an armature spring-loaded by said second spring, said parallel disks being axially movable toward said stationary half by said spring-loaded armature upon switching off said electromagnet by said switch; said disks having facing surfaces with ramp-shaped elevations sliding against each other upon limited relative rotation of said disks and force said disks axially apart; said first spring pressing thereby apart axially said housing and said base.

2. A device as defined in claim 1, including a control circuit with a pulse comparator for controlling the electricity to said electromagnet, said pulse comparator having first and second inputs and one output, said first input accepting a sequence of pulses representing the speed of the shaft, said second input accepting a sequence of pulses representing the speed of a motor, said output emitting a signal controlling the interruption of said electricity.

3. A device as defined in claim 2, including an annular pulse generator wrapped around said stationary half and generating a sequence of pulses representing the speed of said shaft.

4. A device as defined in claim 1, wherein said moving half and said stationary half have a lining over a surface contacting the other half.

5. A device as defined in claim 1, wherein said moving first spring augments the force exerted between said housing and said base and thereby a braking force exerted by the brake.

6. A device as defined in claim 1, wherein said moving half is displaceable axially in relation to said base against said stationary half by said electromagnet and in an opposite direction by said second spring.

7. A device as defined in claim 1, wherein said stationary half travels back and forth inside said housing and being forcible against said housing by said moving half when the device is actuated.

8. A device as defined in claim 7, wherein said stationary half has a surface facing said housing and having a lining.

9. A device as defined in claim 7, including a seal and a baffle between said housing and said stationary half, said baffle diverting any transmission oil penetrating said seal out through specific outlets in said housing.

10. A safety device for preventing mechanically raised and lowered means and roll-up gates from crashing downward when a motor or transmission fails, comprising: a friction brake having a stationary half and a moving half; a housing; said stationary half being secured to a shaft inside said housing; the motor having motor means for driving said mechanically raised and lowered means and roll-up gates through said shaft; said moving half being mounted on a base and being electromagnetically displaceable axially in relation to said base and against said stationary half, a force exerted by said moving half against said stationary half being augmented by a first spring engaging between said housing and said base; supplying said electricity, said moving half comprising two parallel disks rotatable against each other and engageable with said stationary half and held by said base; at least one electromagnet and at least one second spring; a switch for supplying electricity to said electromagnet; said electromagnet having an armature spring-loaded by said second spring, said parallel disks being axially movable toward said stationary half by said spring-loaded armature upon switching off said electromagnet by said switch; said disks having facing surfaces with ramp-shaped elevations sliding against each other upon limited relative rotation of said disks and force said disks axially apart; said first spring pressing thereby apart axially said housing and said base; a control circuit with a pulse comparator for controlling the electricity to said electromagnet, said pulse comparator having first and second inputs and one output, said first input accepting a sequence of pulses representing the speed of the shaft, said second input accepting a sequence of pulses representing the speed of a motor, said output emitting a signal controlling the interruption of said electricity; said moving half and said stationary half having a lining over a surface contacting the other half; said first spring augmenting the force exerted between said housing and said base and thereby a braking force exerted by the brake; said moving half being displaceable axially in relation to said base against said stationary half by said electromagnet and in an opposite direction by said second spring; an annular pulse generator wrapped around said stationary half and generating a sequence of pulse representing the speed of said shaft; said stationary half traveling back and forth inside said housing and being forcible against said housing by said moving half when the device is actuated; said stationary half having a surface facing said housing and having a lining; a seal and a baffle between said housing and said stationary half, said baffle diverting any transmission oil penetrating said seal out through specific outlets in said housing.

* * * * *